Feb. 25, 1969 R. C. MOTT 3,429,323

FLUID AMPLIFIER

Filed Dec. 23, 1965

INVENTOR.
RICHARD C. MOTT

BY Alfred N. Feldman
ATTORNEY

INVENTOR.
RICHARD C. MOTT
BY Alfred N. Feldman
ATTORNEY

United States Patent Office 3,429,323

Patented Feb. 25, 1969

3,429,323

FLUID AMPLIFIER

Richard C. Mott, Harwood Heights, Ill., assignor to Honeywell Inc., Minneapolis, Minn., a corporation of Delaware Filed Dec. 23, 1965, Ser. No. 516,050
U.S. Cl. 137—81.5 7 Claims
Int. Cl. F15c *13/00*

ABSTRACT OF THE DISCLOSURE

A turbulence type fluid amplifier including a shroud around the power input tube. In the presence of a control signal the laminar input stream becomes entrained to the shroud, increasing the stream diameter and causing the laminar stream to become turbulent. The amplifier is bistable in that both the laminar and turbulent states continue in the absence of a continuing control signal. The amplifier can also be modified to perform in a modulating manner.

The present invention is directed to an improved type of fluid amplifier, and more specifically is directed to an improvement in a pure fluid amplifier generally referred to as a turbulence type of amplifier.

The turbulence type fluid amplifier is an amplifying device wherein a laminar flow of fluid is generated in an input means and this laminar fluid flow is directed to a receiver means. Adjacent the laminar fluid flow is a secondary or control signal inlet means that provides a fluid flow at substantially right angles to the input laminar fluid flow. When a signal is introduced to the signal inlet means, it strikes the laminar flow and disrupts the laminar pattern thereby reducing the amount of fluid reaching the receiver means. The turbulent type fluid amplifiers previously known all relay on the introduction in free space of a control signal at substantially right angles to the laminar fluid flow that is being controlled. These devices are of a proportional type, that is the fluid introduced for control purposes provides a continuous variation of the amount of fluid picked up by the receiver means.

The present invention is directed to a unique type of turbulence type of fluid amplifier that can be operated either as a proportional device or as a bistable or "off-on" device. The present invention is accomplished by utilizing a shroud means for encircling collar around the input means of the amplifier. The shroud means or collar is larger in dimension than the laminar fluid flow and is sized to enable the laminar fluid flow to become entrained to the shroud means, thereby providing a space around the laminar fluid flow for control purposes. A control signal is introduced into the shroud means and the unusual control function of the present invention results.

The present invention will be more fully understood when the drawing accompanying the present specification is considered in detail, wherein.

Figure 1:
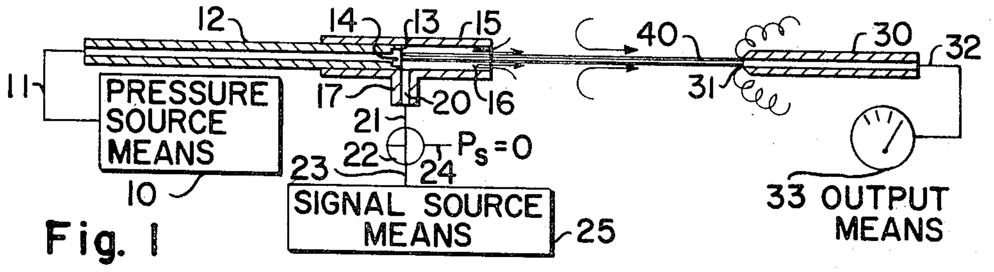
FIGURE 1 is a schematic cross section of a turbulence type amplifier utilizing the present invention.
Figure 3:
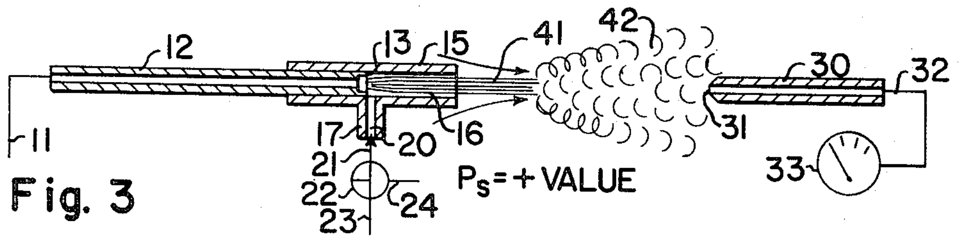
Figure 4:
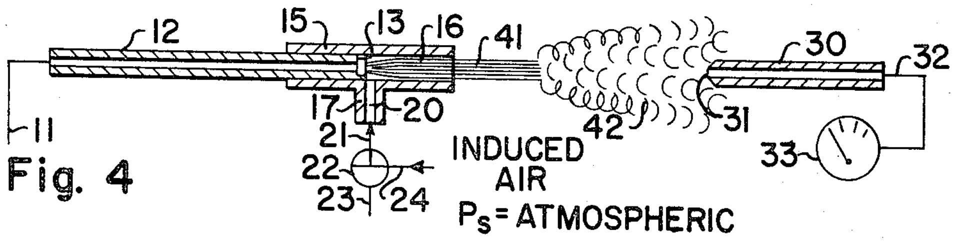
Figure 5:
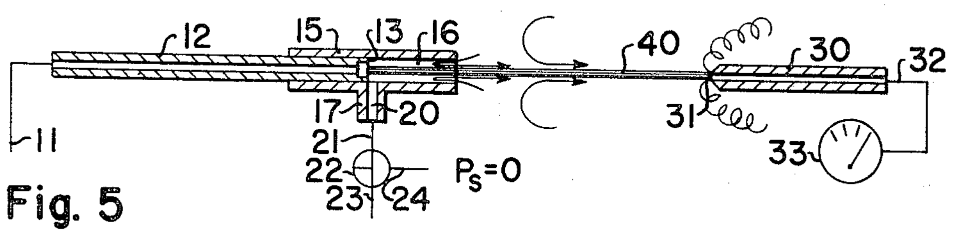
Figures 6, 7, 8, 9, 10:
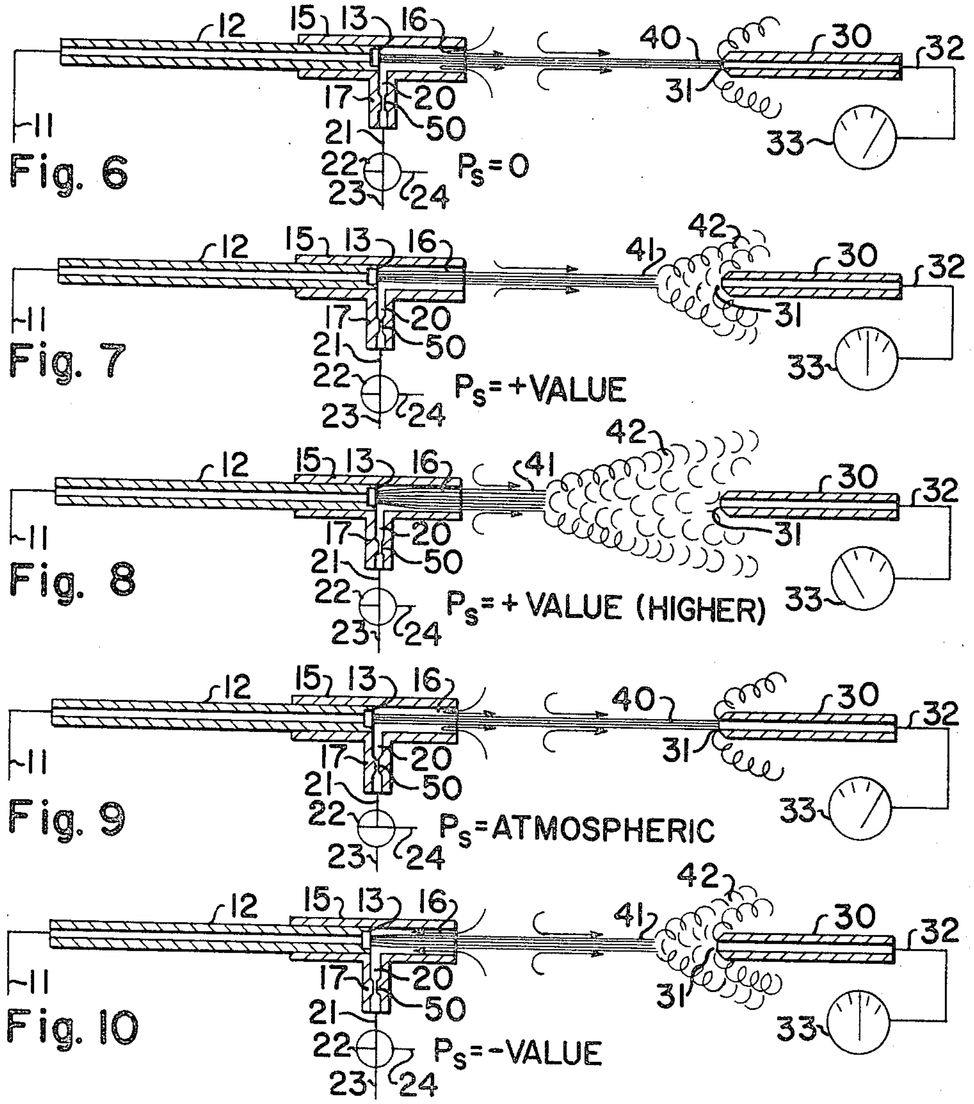

FIGURES 3, 4, and 5 disclose one mode of operation of the amplifier disclosed in FIGURE 1;

FIGURE 6 is a further modification of the present invention;

FIGURES 7, 8, and 9 disclose the mode of operation of the amplifier disclosed in FIGURE 6;

FIGURE 10 is a further mode of operating the amplifier of FIGURE 1; and

Figure 11:
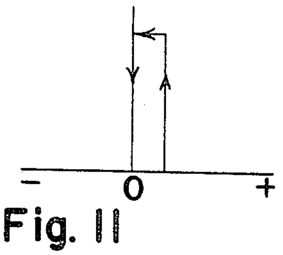
Figure 12:
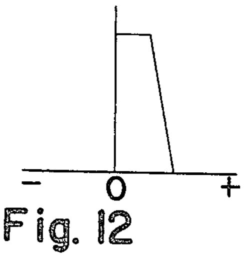
Figure 13:
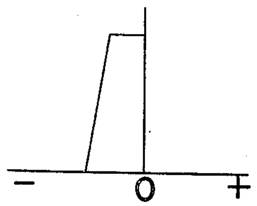

FIGURE 11, FIGURE 12, and FIGURE 13 disclose the performance curves for the three variations of amplifiers disclosed in FIGURES 1, 6, and 10.

FIGURE 1 discloses the basic concept of the present invention. The device in FIGURE 1 includes a pressure source means 10 connected to a pipe 11 that in turn is connected to the inlet portion 12 of the novel fluid amplifier. Inlet portion 12 terminates in input means 13 that has a slightly enlarged portion 14. Encircling the input means 13 is a collar or shroud means 15. The shroud means or collar 15 is generally of the same configuration as the inlet means 13 being larger than the inlet means 13 but sized to permit entrainment of the laminar input flow thereto, thereby providing a chamber 16, the function of which will be described subsequently.

Connected to the shroud means 15 is an extension 17 that contains a control signal inlet or input means 20 in the form of a hole. The control signal inlet means 20 connects to the chamber 16 and is supplied with a pressure by means of a pipe 21. Pipe 21 is connected to valve means 22 so that is of a conventional three-way type. The valve means 22 has an outlet connected to the pipe 21 and an inlet connected to pipe 23. Also connected to valve means 22 is an outlet to atmosphere 24. The valve means 22 that is of a conventional three-way type. or can be adjusted to connect between the pipe 21 and the outlet 24, depending on the setting of the valve means 22. The valve means 22, being of a conventional design, will not be described further at this point. Connected to pipe 23 is a signal source means 25. The signal source means 25 provides a fluid pressure either of a modulating or pulsing type depending on the mode of operation of the overall device, as will be brought out subsequently.

Associated with the fluid amplifier disclosed in FIGURE 1 is a receiver means 30 that in effect is a pointed tube having an opening 31 and an outlet pipe 32 that is connected to output means 33. As the figure shows, the receiver means 30 is spaced from shroud means 15. The output means 33 has been schematically shown as a pressure gauge. In each of the figures of the present application the output means 33 will show a pressure varying from a minimum to a maximum reading from left to right.

In the operation of the fluid amplifier of FIGURE 1, the pressure source means 10 supplies a fluid, that can be considered air for the present case, to the pipe 13 and the pressure source means 10 is adjusted so that the fluid or air flow through the pipe 12 exits at the input means 13 in a laminar manner. By this, it is meant that all of the fluid flow is substantially of a parallel nature thereby generating a continuous uniform stream represented at 40. The laminar stream 40 is directed to the receiver means 30, more particularly at the inlet 31. In the arrangement disclosed in FIGURE 1, the laminar flow 40 strikes the receiver means 30 so as to provide a maximum output in the output means 33. At this particular time the signal source means 25 is providing no signal, whatsoever, to the control signal input means 20. In the disclosure of FIGURE 1 this has been represented by $P_s$ equalizing zero.

Figure 2:
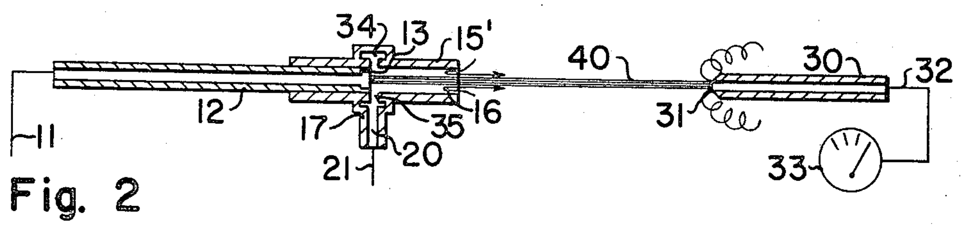
FIGURE 2 is a variation of the design of the amplifier of FIGURE 1.

Before describing the mode of operation, an alternate configuration than shroud means 15 of FIGURE 1. The FIGURE 2. The external connections to the pressure source means 10 and the signal source means 25 have not been shown for convenience. These connections are the same as disclosed in FIGURE 1. The pipe 12 again has an input means 13 encircled by a shroud means 15'. In this case the shroud means 15' has a slightly different configuration that shroud means 15 of FIGURE 1. The shroud means 15' has a continuously annular passage means 34 encircling the input means 13 with the passage means 34 continuously open at 35 to the chamber 16. The passage means 34 is connected by the input signal means 20 in the extension 17 to the pipe 21 which corresponds to the pipe 21 of FIGURE 1. In this particular configuration any pressure signal supplied on pipe 21 and entering the input signal means 20 flows into the passage means 34 and encircles in the shroud means 15' so as to flow uniformly around the laminar fluid flow 40 for control purposes.

Once again in connection with FIGURE 1, the laminar fluid flow 40 has been disclosed as flowing without interruption between the input means 13 and the receiver means 30. If the signal source means 25 applies a signal to the shroud means 15 through the signal input means 20, the condition disclosed in FIGURE 3 occurs. The fluid flowing into the chamber 16 fills the chamber 16 and is entrained to the shroud means 15 thereby altering the laminar fluid flow previously described at 40. The fluid flow from the device of FIGURE 3 is broadened at 41 and is altered so as to become turbulent at 42 thereby reducing the fluid flow received at the receiver means 30 particularly at inlet 31. The reduction of fluid being transferred from the input means 13 to the receiver means 30 is shown on the output means 33 as a minimum value or reading.

It has been found, as disclosed in FIGURE 4, that if the inlet pipe 21 is then vented by valve 22 to the atmosphere, in the case of air flow, by means of pipe 24, that the turbulent condition 42 remains even though the signal from signal source means 25 has been removed from the fluid amplifier. It has been found that entrainment of the input jet continues in the chamber 16 condition by reason of an air flow induced from pipe 24 through the valve means 22 and into the pipe 21, where it flows to chamber 16. Therefore, as long as the valve means 22 is left in the condition shown in FIGURE 4, the amplifier of FIGURE 4 remains sufficiently turbulent so that the output means 33 will receive a minimum pressure at the receiver means 30.

In FIGURE 5, the pipe 21 has been closed by adjusting the valve means 22 to a position thereby changing the pressure $P_s$ back to zero. Reducing the signal $P_s$ to zero by closing the pipe 24, the induced air that was disclosed in FIGURE 4 as flowing to chamber 16 is removed. Once the disturbance of the induced air flow is removed, the present fluid amplifier as disclosed in FIGURE 5, returns to its initial state with a maximum output at the output means 33.

It can thus be noted that by applying the shroud means 15 to a turbulence type of amplifier, a new and unusual result has been obtained. The device, which was normally considered a proportional device, has been made a bistable device having a full "on" or "off" condition.

In FIGURE 6 a variation of the amplifier previously described has been shown. The variation is in the place of a restriction 50 in the input signal means 20. The place of the restriction 50 in the control fluid signal input means 20 does not affect the device when the laminar flow 40 has been established by the adjustment of the pressure source means 10 so that the input means 13 is issuing a laminar flow. The control signal $P_s$ supplied is equal to zero.

In FIGURE 7, however, a positive value of signal is applied to pipe 21 through the restriction 50. In this particular case the fluid flow into chamber 16 is of a small magnitude so as to only partially disrupt the fluid flow 41 from the laminar condition to a turbulent condition 42, at a point closer to the end 31 of the receiver means 30. This is shown by the output means 33 indicating approximately one-half value. It has been found, as shown in FIGURE 8, that by increasing the signal on pipe 21 above that disclosed in FIGURE 7, that the air flow 41 becomes turbulent at 42 which is further from the input 31 of the receiver means 30. In this case, the output means 33 shows a minimum value and the amplifier thus disclosed in FIGURES 6, 7, and 8 is a proportional device once again as opposed to a device of a bistable type previously disclosed.

It has been further noted, as in FIGURE 9, that with the connection of pipe 21 to the atmosphere by means of valve 22 and pipe 24, as in the case of an air fed amplifier, that the device does not induce an air flow of a sufficient magnitude to retain its previous condition, but reverts to a laminar flow 40 from the input means 13. It has thus become apparent that by the introduction of a sufficient restriction 50 in the control signal input means 20, that a proportional fluid amplifier has been provided with the shroud means 15 still utilized.

In FIGURE 10, there is disclosed the same amplifier as disclosed in FIGURE 1, with the exception that the control signal input means 20 has been provided with a signal on pipe 21 of a negative value. By negative value it is meant that the value is below atmospheric in the case of a fluid amplifier operating on air pressure and open to the atmosphere at the laminar flow stream 40. The entire device could be enclosed and operated on some fluid other than air, and at some other pressure reference level. In any case, the indication of a negative value for the input control signal $P_s$ is that a suction or reduced value below that normally utilized has been applied. In this particular case the application of a negative value to the pipe 21 causes a flow of fluid 51 into the chamber 16 from around the laminar flow 40 thereby creating the turbulence 42 and reducing the level at the output means 33. The device disclosed in FIGURE 10 is a proportional device having a proportional variation in output from the receiver means 30 depending on the value of the suction or negative pressure applied to pipe 21. In the more conventional turbulence type amplifiers this is not possible as the input control signal to a conventional turbulence type amplifier is an open jet and provides no means of sucking the fluid into a chamber 16 of the shroud means 15 to obtain this control function.

In FIGURES 11, 12, and 13 the characteristic performance curves of the three different types of amplifiers have been shown. FIGURE 11 discloses the bistable operation wherein the control signal causes the device to shift from one level and remain at that level until a second signal has been provided wherein the control fluid shifts back to its original state. In FIGURE 12, the control signal shows the shift of the amplifier, but also due to the slope of the curve indicates the proportional aspects of the application of a control signal through a restriction to the novel turbulence type of amplifier. In FIGURE 13, the negative control signal has been disclosed thereby giving a slope of a reversed nature to that disclosed in FIGURE 12. It is quite obvious that amplifiers having the characteristics of FIGURES 11, 12 and 13 could be combined to obtain any slope desired at the output.

The present application broadly discloses a turbulence type of amplifier wherein a shroud means or collar of some type has been placed around the input means to obtain an unusual type of control function not previously available in turbulence type amplifiers. The applicant has disclosed a number of specific amplifier variations as being representative of possible modifications of this invention. The applicant wishes to be limited in the scope of the invention, however, only by the scope of the appended claims.

I claim:

1. A turbulence type fluid amplifier adapted to be connected to a fluid source, including: input means issuing a laminar fluid flow; receiver means in line with said input means to receive said fluid flow from said input means; shroud means encircling said input means to provide a chamber around said fluid flow, said chamber being larger than said issuing laminar fluid flow input and being of such size as to enable said issuing fluid flow input to become entrained to said shroud means; said shroud means being spaced from said receiver means; and control signal input means in fluid communication with said chamber for introduction of a control fliud signal to said chamber; said control fluid signal causing said laminar fluid flow to become entrained to said shroud means and thereby cause said laminar flow to become turbulent between said shroud means and said receiver means and change the fluid flow reaching said receiver means.

2. A fluid amplifier adapted to be connected to a fluid source as described in claim 1, wherein said control input means receives a first control fluid signal for a first mode of amplifier operation and said amplifier continues the said first mode of operation after said first control fluid signal is removed; said control input means receives a second control fluid signal for a second mode of amplifier operation and said amplifier continues the said second mode of operation after said second control fluid signal is removed.

3. A fluid amplifier adapted to be connected to a source as described in claim 1, wherein said control fluid signal is of a negative value.

4. A fluid amplifier adapted to be connected to a fluid source as described in claim 1, wherein said shroud means includes passage means encircling said input means with said passage means continuously open to said chamber; said passage means connected to said signal input means and providing a fluid connection between said chamber and said control signal input means.

5. A fluid amplifier adapted to be connected to a fluid source as described in claim 1, wherein said control signal input means includes a fluid restriction.

6. A fluid amplifier adapted to be connected to a fluid source as described in claim 5, wherein said control fluid signal is continuously variable to in turn continuously change the fluid flow reaching said receiver means.

7. A fluid amplifier adapted to be connected to a source as described in claim 5, wherein said control fluid signal is of a negative value.

References Cited

UNITED STATES PATENTS

| | | | |
|---|---|---|---|
| 1,628,723 | 5/1927 | Hall | 137—81.5 XR |
| 3,124,160 | 3/1964 | Zilberfarb | 137—81.5 |
| 3,175,569 | 3/1965 | Sowers | 137—81.5 |
| 3,182,674 | 5/1965 | Horton | 137—81.5 |
| 3,186,422 | 6/1965 | Boothe | 137—81.5 |
| 3,234,955 | 2/1966 | Auger | 137—81.5 |
| 3,269,419 | 8/1966 | Dexter | 137—81.5 |
| 3,272,215 | 9/1966 | Bjornsen et al. | 137—81.5 |
| 3,279,489 | 10/1966 | Bjornsen et al. | 137—81.5 |
| 3,334,641 | 8/1967 | Bjornsen | 137—81.5 |

SAMUEL SCOTT, *Primary Examiner.*